United States Patent
Mazrooee et al.

(10) Patent No.: US 11,753,584 B2
(45) Date of Patent: *Sep. 12, 2023

(54) LIQUID SAND TREATMENT OPTIMIZATION

(71) Applicant: Halliburton Energy Services, Inc., Houston, TX (US)

(72) Inventors: Mehdi Mazrooee, Double Oak, TX (US); Ubong Akpan Inyang, Humble, TX (US); Alexander Jose Verde Salas, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,884

(22) Filed: Jun. 22, 2022

(65) Prior Publication Data

US 2022/0315829 A1 Oct. 6, 2022

Related U.S. Application Data

(63) Continuation of application No. 17/051,121, filed as application No. PCT/US2018/048115 on Aug. 27, 2018, now Pat. No. 11,441,068.

(51) Int. Cl.
  *E21B 43/267* (2006.01)
  *C09K 8/68* (2006.01)
  *C09K 8/80* (2006.01)
  *E21B 43/26* (2006.01)

(52) U.S. Cl.
  CPC .......... *C09K 8/685* (2013.01); *C09K 8/80* (2013.01); *E21B 43/267* (2013.01); *C09K 2208/04* (2013.01); *C09K 2208/20* (2013.01); *C09K 2208/28* (2013.01); *C09K 2208/32* (2013.01); *C09K 2208/34* (2013.01); *E21B 43/2607* (2020.05)

(58) Field of Classification Search
  None
  See application file for complete search history.

(56) References Cited

U.S. PATENT DOCUMENTS

| 4,794,806 A | 1/1989 | Nicoli et al. |
| 4,964,465 A | 10/1990 | Surles |
| 5,799,734 A | 9/1998 | Norman et al. |
| 6,644,844 B2 | 11/2003 | Neal et al. |

(Continued)

FOREIGN PATENT DOCUMENTS

| CN | 103233720 | 8/2013 |
| WO | 2009078818 | 6/2009 |
| WO | 2015021523 | 2/2015 |

OTHER PUBLICATIONS

ISRWO International Search Report and Written Opinion for PCT/US2018/048115 dated May 22, 2019.

(Continued)

*Primary Examiner* — Andrew Sue-Ako
(74) *Attorney, Agent, or Firm* — Thomas Rooney; C. Tumey Law Group, PLLC (57) ABSTRACT

A method of hydraulic fracturing may comprise mixing at least one liquid sand mixture with a fluid to produce a fracturing fluid; and conveying the fracturing fluid to two or more wellbores simultaneously, wherein the wellbores penetrate a subterranean formation.

20 Claims, 3 Drawing Sheets

(56) References Cited

U.S. PATENT DOCUMENTS

| | | |
|---|---|---|
| 7,090,017 B2 | 8/2006 | Justus et al. |
| 7,621,328 B1 | 11/2009 | Case et al. |
| 7,841,394 B2 | 11/2010 | McNeel et al. |
| 7,946,340 B2 | 5/2011 | Surjaatmadja et al. |
| 8,251,570 B2 | 8/2012 | Hughes et al. |
| 9,863,228 B2 | 1/2018 | Shampine et al. |
| 11,441,068 B2 * | 9/2022 | Mazrooee ................ C09K 8/88 |
| 2005/0028979 A1 | 2/2005 | Brannon et al. |
| 2007/0125543 A1 | 6/2007 | McNeel et al. |
| 2010/0046316 A1 | 2/2010 | Hughes et al. |
| 2011/0120705 A1 | 5/2011 | Walters et al. |
| 2012/0111565 A1 | 5/2012 | Garcia-Lopez De Victoria et al. |
| 2014/0352968 A1 | 12/2014 | Pitcher et al. |
| 2016/0312594 A1 | 10/2016 | Kuchuk et al. |

OTHER PUBLICATIONS

Pe, Simul-Frac , Available at https://www.halliburton.com/en-US/ps/stimulation/fracturing/simul-frac-operations.html.
Office Action Summary for U.S. Appl. No. 17/051,121 dated Dec. 13, 2021.
Final Office Action Summary for U.S. Appl. No. 17/051,121 dated Apr. 6, 2022.

\* cited by examiner

LIQUID SAND TREATMENT OPTIMIZATION

The present application is a continuation of U.S. patent application Ser. No. 17/051,121, filed on Oct. 27, 2020, the entire disclosure of which is incorporated herein by reference. Patent application Ser. No. 17/051,121 is a 371 application of PCT/US2018/048115, filed on Aug. 27, 2018.

BACKGROUND

Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may increase the production of fluids from the subterranean formation.

In order to maintain and/or enhance the conductivity of a fracture in a subterranean formation, proppant may be deposited in the fracture, for example, by introducing a fluid carrying such material into the subterranean formation. The proppant may prevent the fractures from fully closing upon the release of hydraulic pressure, forming conductive channels through which fluids may flow to the wellbore.

BRIEF DESCRIPTION OF THE DRAWINGS

These drawings illustrate certain aspects of the present disclosure, and should not be used to limit or define the disclosure.

DETAILED DESCRIPTION

The present disclosure may relate to subterranean operations, and, in one or more implementations, to fracturing methods and fluids comprising a liquid sand mixture. In hydraulic fracturing treatments, proppant may be used to prevent the closure of fractures, and thus, may improve the hydrocarbon production from a fracture-stimulated reservoir. The proppant may be delivered to individual fractures by a fracturing fluid, which may include an aqueous-based fluid and/or additives (e.g., gelling agents, friction reducing polymers, etc.) to increase viscosity of the fracturing fluid and reduce the particle sedimentation by gravity.

A well may be fractured by pumping a fracturing fluid at or above the fracture gradient through a wellhead fluidically coupled to the well. The fracturing fluid may be mixed in a fracturing blender where a base fluid, such as water, proppant, and chemicals may be added to a blending tub. The fracturing fluid may be pumped from the blending tub to a low-pressure side of a fluid header. Hydraulic fracturing pumps may be fluidically coupled to the low-pressure side of the fluid header where the fracturing fluid is drawn into the hydraulic fracturing pump. The hydraulic fracturing pump may pressurize the hydraulic fracturing fluid and output the pressurized fracturing fluid into a high-pressure side of the fluid header. There may be multiple hydraulic fracturing pumps depending on flow rate and pressure requirements for the particular fracturing operation. Riser pipes may be connected to the high-pressure size of the fluid header that may convey the pressurized fracturing fluid to the wellhead and into the subterranean formation.

Figure 1:
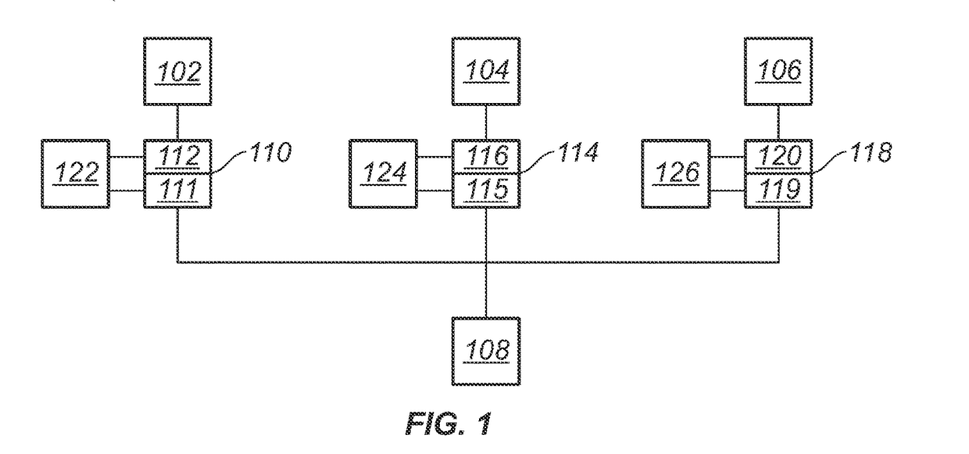
FIG. 1 is a schematic illustration of a simultaneous fracturing operation.

Simultaneous fracturing may refer to the fracturing technique whereby multiple wells are fractured using a common set of blending equipment. FIG. 1 illustrates a system 100 for simultaneous fracturing. In system 100, first well 102, second well 104, and third well 106 may be simultaneously fractured. Blender 108 may blend a fracturing fluid as previously described and provide the fracturing fluid to a low-pressure side in each of first fluid header 110, second fluid header 114, and third fluid header 118. In some examples, blender 108 may be directly connected to a fracturing pump which in turn may be directly connected to a wellhead thereby eliminating the need for a fluid header. As illustrated, first hydraulic fracturing pump 122 may draw the fracturing fluid from first low-pressure header 111 and output a pressurized fluid to first high-pressure header 112. Similarly, second hydraulic fracturing pump 124 and third hydraulic fracturing pump 126 may draw the fracturing fluid from second low-pressure header 115 and third low-pressure header 119 and output to second high-pressure header 116 and third high-pressure header 120, respectively. In simultaneous fracturing, the overall equipment required to fracture multiple wells simultaneously may be reduced as compared to individually fracturing each well simultaneously. For example, only one blender (e.g., blender 108) may be required to fracture multiple wells, such as first well 102, second well 104, and third well 106, as illustrated.

However, simultaneous fracturing may have limitations on the number of barrels per minute that may be pumped when proppant concentrations become relatively higher. For example, a blender may have a finite fracturing tub size and volume flow rate of base fluid and proppant that may be conveyed into the fracturing tub. Some blender units may have a maximum concentration of proppant of 20 ppg (pounds per gallon) (2397 kg/m^3) at a rate of 35 bpm (barrels per minute) (5.565 m^3/min). Other blender units may have a larger or a smaller fracturing tub and flow rate capability. For a three well simultaneous fracturing job requiring 5 ppg (599.1 kg/m^3) at 80 bpm (12.72 m^3/min), the theoretical maximum output of the blender may be 3 ppg (359.5 kg/m^3) which is below the desired concentration. Furthermore, should the blender experience mechanical problems or become unavailable for any reason, the fracturing operation for each well will stop. In conventional fracturing operations where one well is fractured at a time, the failure of one blender will not affect the other wells being fractured.

Figure 2:
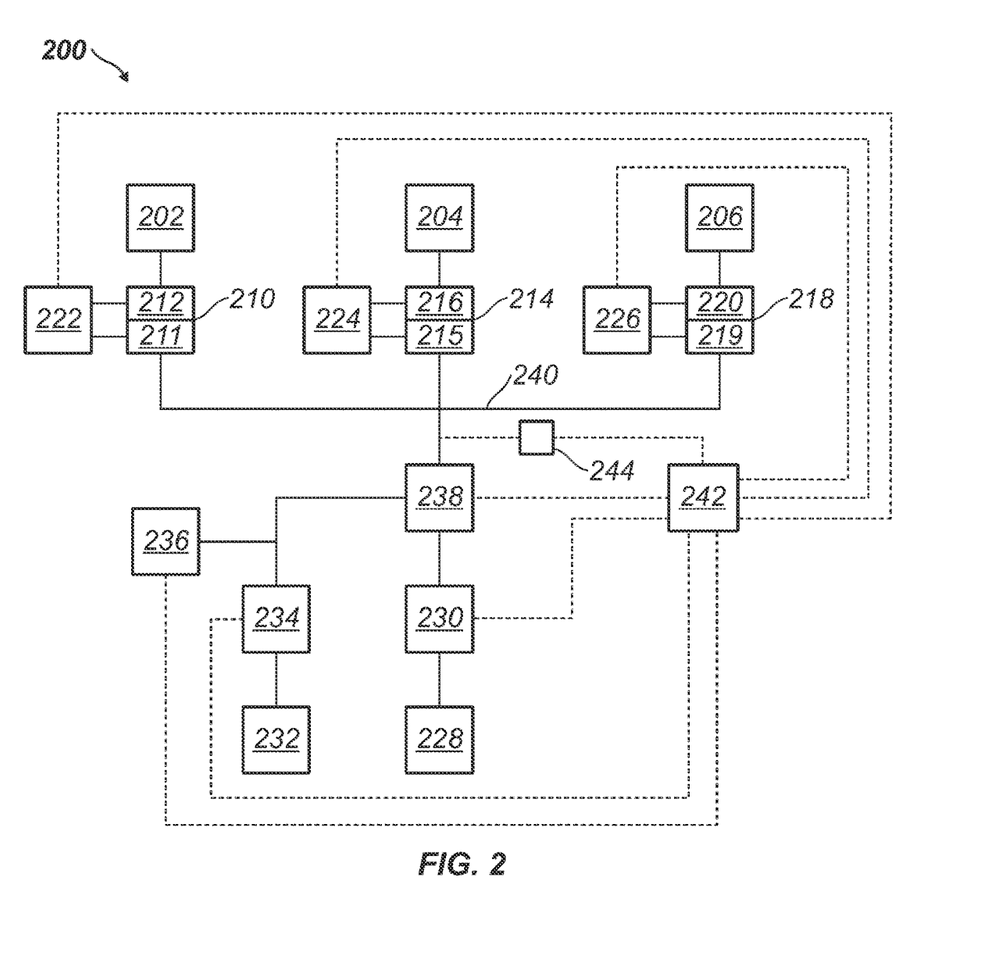
FIG. 2 is another schematic illustration of a simultaneous fracturing operation using liquid sand.

FIG. 2 illustrates a system 200 capable of mixing a fracturing fluid without the use of a blender. As discussed above, simultaneous fracturing when using a single blender as a source of fracturing fluid may be limited to instances where the required proppant concentration is relatively low. In system 200, first well 202, second well 204, and third well 206 may be simultaneously fractured. Although only three wells are illustrated in FIG. 2, one of ordinary skill will appreciate that the systems described herein may be adapted to two, four, five, or even more wells. Simultaneous fracturing of multiple wells with a relatively high proppant concentration may be accomplished by use of liquid sand mixture 228. Liquid sand mixture 228 will be described in greater detail below. Liquid sand mixture 228 may be drawn by proppant pump 230 and diluted with water from water source 232 to produce a fracturing fluid with a desired proppant concentration. Water source 232 may comprise any water source suitable for blending the fracturing fluid. Water from water source 232 may be pumped by water pump 234 and combined with liquid sand mixture 228 in mixer 238 to create the fracturing fluid. The fracturing fluid from mixer 238 may be conveyed through conduit 240 to a low pressure side in each of first fluid header 210, second fluid header 214, and third fluid header 218. In some examples, the output of water pump 234 may be directly connected to an inlet of proppant pump 230 to mix the fracturing fluid without the use of a mixer 238. In other examples, mixer 238 may be an inline mixer. Fracturing fluid additives 236 may also be added to the water before mixing the water with liquid sand mixture 228. While not shown, fracturing fluid additives 236 may be added by any means such as liquid additive pumps and/or dry handling systems. First hydraulic fracturing pump 222 may draw the fracturing fluid from first low-pressure header 211 and output a pressurized fluid to first high-pressure header 212. Similarly, second hydraulic fracturing pump 224 and third hydraulic fracturing pump 226 may draw the fracturing fluid from second low-pressure header 215 and third low-pressure header 219 and output to second high-pressure header 216 and third high-pressure header 220, respectively. The output from each of first high-pressure header 212, second high-pressure header 216, and third high-pressure header 220 may be conveyed to each respective well.

Liquid sand mixture 228 may comprise multiple liquid sand mixtures with different properties such as density, proppant particle size distribution, proppant crush strength, or combinations thereof. System 200 may be configured to mix a fracturing fluid from multiple liquid sand mixtures such that the resultant fracturing fluid has a particular desired property. For example, a fracturing fluid may be mixed that comprises 20/40 sand and 100 mesh sand, for example, which may be conveyed to multiple wells simultaneously. System 200 may also be configured to "pulse" a fracturing fluid by alternately pumping a proppant-laden fluid and a proppant-free fluid into the wellbores.

Electronic control system 242 may provide an interface to control each piece of equipment in system 200. Each piece of equipment may be coupled electronically by a LAN (Local Area Network) illustrated in FIG. 2 as dashed lines connecting each piece of equipment to electronic control system 242. The LAN may be wired or wireless. Other suitable connections to the equipment may also be used. Electronic control system may comprise a microprocessor, memory, software, and input/output means. The electronic control system may allow an operator to control each piece of equipment, for example, to maintain a set point for proppant concentration in the fracturing fluid.

System 200 may further comprise a fluid analyzer 244 configured to measure one or more properties of the fracturing fluid. Some properties may include, without limitation, density, composition, or a combination thereof. Fluid analyzer 244 may send a signal to electronic control system 242, which may in turn adjust one or more operating parameters of proppant pump 230, water pump 234, and fluid additives 235 to change a composition of the fracturing fluid. For example, electronic control system 242 may maintain a particular set point density of the fracturing fluid by adjusting a flow rate through proppant pump 230 or water pump 234. The microprocessor may interpret the signal provided by fluid analyzer 244 to ascertain whether the respective components of the fracturing fluid are at the correct flow rates to produce a fracturing fluid with the desired density and/or composition. A flow rate of liquid sand mixture 228, for example, may be adjusted up or down to adjust the composition, and thereby the density of the fracturing fluid.

Liquid sand mixture 228 may be stored in tanks such as fracturing tanks, for example, which may provide pump 230 with liquid sand mixture 228. In some examples, there may be more than one fracturing tank whereby each fracturing tank may be connected by a fluid header to pump 230. Liquid sand mixture 228 in the tanks may be prepared by a blender for example and then pumped into the tanks, or alternatively, prepared off site and brought to the wellsite by trailer. In offshore applications, liquid sand mixture 228 may be brought to the site inside of a frac boat.

System 200 may also allow for fracturing fluids comprising multiple types, shapes, qualities, crush strengths, and particle size ranges of proppant to be prepared. For example, liquid sand mixture 228 may comprise multiple tanks with different ranges of proppant sizes contained in each tank. In another example, liquid sand mixture 228 may comprise tanks with different proppant sizes contained in the same tank. Electronic control system 242 may provide a signal to a valve on each fracturing tank to open or close depending on the desired concentration of each liquid sand mixture in the resultant fracturing fluid. A fracturing fluid with any desired packing volume fraction suitable for a particular application may be prepared. As used herein, the term "packing volume fraction" refers to the volume of the particulate materials in a fluid divided by the total volume of the fluid. The size ranges of the proppants may be selected, as well as their respective proportions, in order to provide a maximized packing volume fraction. The present examples may include a combination of two or more liquid sand mixtures comprising proppants wherein the average particle size ($d_{50}$) of the two or more liquid sand mixtures are in size ranges "disjointed" from one another. In some examples, each of the proppants may include a different average particle size selected from the following ranges: about 0.05 microns to about 0.5 microns, 0.5 microns to about 10 microns, about 10 microns to about 20 microns, about 20 microns to about 200 microns, about 200 microns to about 800 microns, and greater than about 1 millimeter.

System 200 may also allow for a different fracturing fluid to be delivered to each wellhead, for example. A fracturing fluid may be prepared according to the methods described above but a valve, such as a shutoff valve, ahead of each of the first fluid header 210, second fluid header 214, and third fluid header 218 may be selectively shut off such that the fracturing fluid is only delivered to the wellhead of interest. Such a system may save rig time by not having to rig up to each wellhead after a fracturing stage has been completed. In another example, a diverting agent may be selectively introduced into the fracturing fluid before each of the first fluid header 210, second fluid header 214, and third fluid header 218 such that the diverting agent may be applied to only the selected wellbore.

The liquid sand mixture may comprise water, proppant, and a gelling agent. The proppant may be present in the liquid sand mixture at a concentration from about 15 lb/gal (1797 kg/m^3) to about 30 lb/gal (3595 kg/m^3). Alternatively, the proppant may be present in an amount from about 15 lb/gal (1797 kg/m^3) to about 20 lb/gal (2397 kg/m^3), from about 20 lb/gal (2397 kg/m^3) to about 25 lb/gal (2996 kg/m^3), or from about 25 lb/gal (2996 kg/m^3) to about 30 lb/gal (3595 kg/m^3). The amount of gelling agent included in the liquid sand mixture may range from about 50 lbs/1,000 gal (5.991 kg/m^3) to about 80 lbs/1,000 gal (9.586 kg/m^3). Alternatively, from about 50 lbs/1,000 gal (5.991 kg/m^3) to about 55 lbs/1,000 gal (6.59 kg/m^3), from about 55 lbs/1,000 gal (6.59 kg/m^3) to about 60 lbs/1,000 gal (7.19 kg/m^3), from about 60 lbs/1,000 gal (7.19 kg/m^3) to about 65 lbs/1,000 gal (7.789 kg/m^3), or from about 65 lbs/1,000 gal (7.789 kg/m^3) to about 70 lbs/1,000 gal (8.388 kg/m^3), from about 70 lbs/1,000 gal (8.388 kg/m^3) to about 75 lbs/1,000 gal (8.987 kg/m^3), or from about 75 lbs/1,000 gal (8.987 kg/m^3) to about 80 lbs/1,000 gal (9.586 kg/m^3).

The water used herein may include fresh water, produced water, salt water, or any other suitable water. The term "salt water" is used herein to mean unsaturated salt solutions and saturated salt solutions including brines and seawater. Examples of salts that can be used include, but are not limited to, sodium chloride, sodium bromide, calcium chloride, potassium chloride, ammonium chloride and mixtures thereof. Without limitation, the salt or salts used can be present in the salt water in a concentration up to about 66 wt. % thereof and the salt water may have a density up to about 15.5 pounds per gallon (1.857 kg/L). The amount of water in the fracturing fluid may about up to about 60 wt. %, up to about 80 wt. %, or up to about 99 wt. % depending on the concentration of salt and additives. Some specific examples may include 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, or 99 wt. %.

Gelling agents may be included in the liquid sand mixture to increase the liquid sand mixture's viscosity, which may be desirable for a number of reasons in subterranean applications. The resulting fracturing fluid from dilution of the liquid sand mixture may for example, aid in transferring hydraulic pressure to divert treatment fluids to another part of a formation or for preventing undesired leak-off of fluids into a formation from the buildup of filter cakes. The increased viscosity of the gelled or gelled and cross-linked liquid sand mixture, among other things, may reduce fluid loss and may allow the liquid sand mixture to transport significant quantities of suspended proppant. Gelling agents may include, but are not limited to, any suitable hydratable polymer, including, but not limited to, galactomannan gums, cellulose derivatives, combinations thereof, derivatives thereof, and the like. Galactomannan gums are generally characterized as having a linear mannan backbone with various amounts of galactose units attached thereto. Examples of suitable galactomannan gums include, but are not limited to, gum arabic, gum ghatti, gum karaya, tamarind gum, tragacanth gum, guar gum, locust bean gum, combinations thereof, derivatives thereof, and the like. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The gelling agent may also include xanthan gums, scleroglucan, succinoglycan, diutan, alginate, pectinate, and/or chitosan. In some examples, the gelling agent may be a crosslinkable polymer. The crosslinkable polymers included in the liquid sand mixures of the present disclosure may be naturally-occurring, synthetic, or a combination thereof. The crosslinkable polymers may comprise hydratable polymers that contain one or more functional groups such as hydroxyl, cis-hydroxyl, carboxyl, sulfate, sulfonate, phosphate, phosphonate, amino, or amide groups. In certain systems and/or methods, the crosslinkable polymers may be at least partially crosslinked, wherein at least a portion of the molecules of the crosslinkable polymers are crosslinked by a reaction comprising a crosslinking agent.

Friction reducing polymers may be included as a fracturing fluid additive to form a slickwater fluid, for example. A friction reducing polymer may be added to the water, added to the liquid sand, or added to the fracturing fluid, for example. The friction reducer polymer may be a synthetic polymer. Additionally, for example, the friction reducer polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the fracturing fluid. The term "polymer" in the context of a polymer, may be intended to refer to the acid form of the friction reducing polymer, as well as its various salts.

The friction-reducing polymer may be included in the fracturing fluid in the form of a liquid additive, for example, in an amount of about 0.5 gallons of the friction reducing polymer per thousand gallons of the fracturing fluid ("GPT") to about 2 GPT, about 2 GPT to about 5 GPT, or about 5 GPT to about 10 GPT. Some specific amounts may include about 0.5 GPT, about 1 GPT, about 1.5 GPT, about 2 GPT, about 2.5 GPT, about 3 GPT, about 3.5 GPT, about 4 GPT, about 4.5 GPT, about 5 GPT, about 5.5 GPT, about 6 GPT, about 6.5 GPT, about 7 GPT, about 7.5 GPT, about 8 GPT, about 8.5 GPT, about 9 GPT, about 9.5 GPT, or about 10 GPT. One of ordinary skill will understand that a volume ratio such as GPT is equivalent to a volume ratio using a different basis such as liters or cubic meters. The friction reducing polymers may be included in the fracturing fluid in an amount sufficient to reduce friction without gel formation upon mixing. By way of example, the fracturing fluid comprising the friction reducing polymer may not exhibit an apparent yield point. While the addition of a friction reducing polymer may minimally increase the viscosity of the fracturing fluid, the friction reducing polymers may generally not be included in the example fracturing fluid in an amount sufficient to substantially increase the viscosity. For example, when proppant is included in the fracturing fluid, velocity rather than fluid viscosity generally may be relied on for proppant transport. Additionally, the friction reducing polymer may be provided as a dry additive and may be present in an amount in the range from about 0.01% wt. % to about 0.15 wt. %, alternatively in an amount in the range from about 0.025 wt. % to about 0.1 wt. %, or alternatively in an amount in the range from about 0.1 wt. % to about 0.2 wt. %.

Typically, the proppant may include a collection of solid particles that may be pumped into the subterranean formation, such that the solid particles hold (or "prop") open the fractures generated during a hydraulic fracturing treatment. While the proppant mixture is generically described herein as a "liquid sand mixture," the use of the term "liquid sand"

is not intended to imply that the proppant is sand or that the that liquid sand mixture comprises sand. Rather, the proppant may include a variety of solid particles, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant may comprise graded sand. Other suitable proppant that may be suitable for use in subterranean applications may also be useful. Without limitation, the proppant may have a particle size in a range from about 2 mesh to about 400 mesh, U.S. Sieve Series. By way of example, the proppant may have a particle size of about 10 mesh to about 70 mesh with distribution ranges of 10-20 mesh, 20-40 mesh, 40-60 mesh, or 50-70 mesh, depending, for example. Alternatively, the proppant may comprise a micro-proppant wherein the micro-proppant may have an average particle size of about 10 μm to about 100 μm. The average particle size may be measured by a Malvern Particle Size Analyzer, available from Malvern Instruments Ltd., of Worcestershire, UK. For a given particle size, the particle size analyzer may identify the volume percentage of particles in the sample that are beneath that particle size which may be referred to as the $d_{50}$ particle size. The proppant may be carried by the fracturing fluid. Without limitation, the proppant may be present in the fracturing fluid in a concentration at a point in a range of about 0.1 pounds per gallon ("ppg") (12 kg/m^3) to about 10 ppg (1198 kg/m^3), at a point in a range of about 0.1 ppg (12 kg/m^3) to about 6 ppg (719 kg/m^3), or at a point in a range of about 10 ppg (1198 kg/m^3) to about 20 ppg (2400 kg/m^3). These ranges encompass every number in between, for example. For example, the concentration may range at a point between about 0.5 ppg (24 kg/m^3) to about 4 ppg (479.3 kg/m^3). One of ordinary skill in the art with the benefit of this disclosure should be able to select an appropriate amount of the proppant composition to use for a particular application.

Without limitation, a curable resin may be coated or otherwise disposed on the proppant. Inclusion of the curable resin on the proppant may fill the fractures, providing an in-situ mechanical screen that can hold the proppant in place while maintaining integrity of the well. Curable resins suitable for use with the proppant may include any resin that is capable of forming a hardened, consolidated mass. Many such curable resins are commonly used in consolidation treatments, and some suitable curable resins may include, without limitation, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins may generally require a time-delayed catalyst or an external catalyst to help activate the polymerization of the resins if the cure temperature is low (i.e., less than about 250° F., 121° C.) but may cure under the effect of time and temperature if the formation temperature is above about 250° F. (121° C.), or above about 300° F. (148.9° C.). The amount of curable resin may be from about 0.5% to about 1% v/w, about 1% to about 3% v/w, or about 3% to about 5% v/w with respect to the proppant.

Selection of a suitable curable resin may be affected by the temperature of the subterranean formation to which the proppant may be introduced. By way of example, for a subterranean formation having a bottom hole static temperature ("BHST") ranging from about 60° F. (15.5° C.) to about 250° F. (121° C.), two component epoxy based resins comprising a hardenable resin component and a hardening agent component may be used. For a subterranean formation having a BHST ranging from about 300° F. (148.9° C.) to about 600° F. (315.5° C.), a furan based resin may be used, for example. For a subterranean formation having a BHST ranging from about 200° F. (93.3° C.) to about 400° F. (204.4° C.), either a phenolic based resin or a one component HT epoxy based resin may be suitable, for example. For a subterranean formation having a BHST of at least about 175° F. (° 79.4° C.), a phenol/phenol formaldehyde/furfuryl alcohol resin may also be suitable, for example. With the benefit of this disclosure, one of ordinary skill in the art should be able to recognize and select a suitable resin for use in consolidation treatment applications.

Additionally, the fracturing fluid may comprise any number of fracturing fluid additives, including, but not limited to, salts, acids, fluid loss control additives, crosslinkers, gas, foamers, corrosion inhibitors, catalysts, diverters, friction reducers, antifoam agents, bridging agents, dispersants, flocculants, $H_2S$ scavengers, $CO_2$ scavengers, oxygen scavengers, lubricants, weighting agents and any combination thereof. The fracturing fluid may comprise a surfactant. Surfactants may include, but are not limited to, anionic surfactants such as sodium, potassium, and ammonium salts of long chain alkyl sulfonates and alkyl aryl sulfonates (such as sodium dodecylbenzene sulfonate); dialkyl sodium sulfosuccinates (such as sodium dodecylbenzene sulfonate or sodium bis-(2-ethylthioxyl)-sulfosuccinate); alkyl sulfates (such as sodium lauryl sulfate); alkyl sulfonates (such as methyl sulfonate, heptyl sulfonate, decylbenzene sulfonate, dodecylbenzene sulfonate); and alkoxylated sulfates; nonionic surfactants such as ethoxylated alcohols and polyglucosides; cationic surfactants such as alkyl ammonium bromides, and amphoteric or zwitterionic surfactants such as hydroxysultaines (e.g., cocoamidopropyl hydroxysultaine, lauramidopropyl hydroxysultaine, lauryl hydroxysultaine, etc.). In examples where a foamed fluid is desired, a foaming agent and a foaming gas may be included in the fracturing fluid. The fracturing fluid may be foamed after blending the fracturing fluid, or, alternatively, the components of the fracturing fluid may be foamed before blending. With the benefit of this disclosure, one of ordinary skill in the art should be able to recognize and select suitable additives for use in the fracturing fluid.

Figure 3:
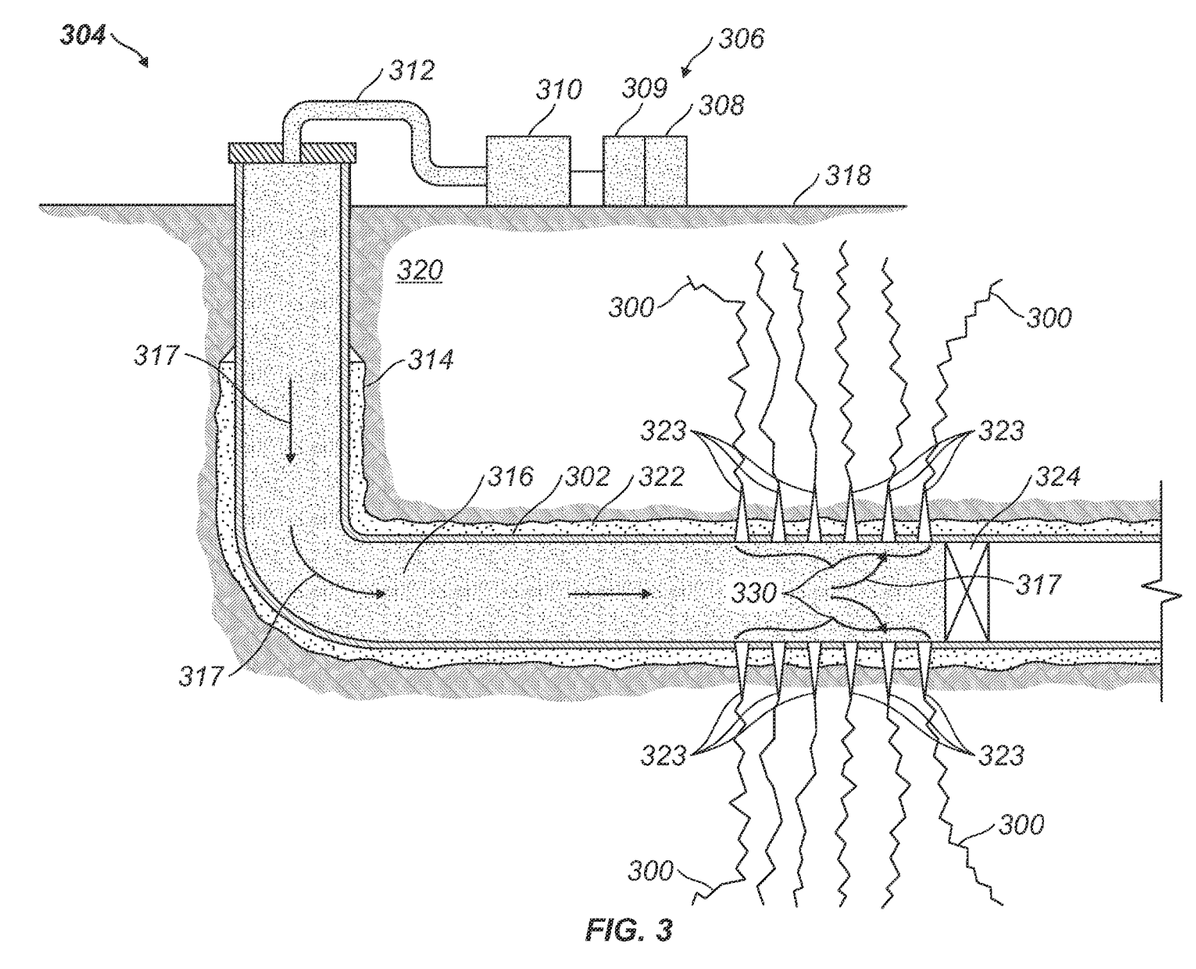
FIG. 3 is a schematic view of an example well system utilized for hydraulic fracturing.

FIG. 3 illustrates an example of a well system 304 that may be used to introduce proppant 316 into fractures 300. Well system 304 may include a fluid handling system 306, which may include fluid supply 308, mixing equipment 309, pumping equipment 310, and wellbore supply conduit 312. Pumping equipment 310 may be fluidly coupled with the fluid supply 308 and wellbore supply conduit 312 to communicate a fracturing fluid 317, which may comprise proppant 316 into wellbore 314. The fluid supply 308 and pumping equipment 310 may be above the surface 318 while the wellbore 314 is below the surface 318.

Well system 304 may also be used for the pumping of a pad or pre-pad fluid into the subterranean formation at a pumping rate and pressure at or above the fracture gradient to create at least one fracture 300 in subterranean formation 320. Well system 304 may then pump the fracturing fluid 317 into subterranean formation 320 surrounding the wellbore 314. Generally, a wellbore 314 may include horizontal, vertical, slanted, curved, and other types of wellbore geometries and orientations, and the proppant 316 may generally be applied to subterranean formation 320 surrounding any portion of wellbore 314, including fractures 300. The wellbore 314 may include the casing 302 that may be cemented (or otherwise secured) to the wall of the wellbore 314 by cement sheath 322. Casing 302 may also comprise an uncemented liner. Perforations 323 may allow communication between the wellbore 314 and the subterranean formation 320. As illustrated, perforations 323 may penetrate casing 302 and cement sheath 322 allowing communication between interior of casing 302 and fractures 300. A plug 324, which may be any type of plug for oilfield applications (e.g., bridge plug), may be disposed in wellbore 314 below the perforations 323.

In accordance with systems and/or methods of the present disclosure, a perforated interval of interest 330 (depth interval of wellbore 314 including perforations 323) may be isolated with plug 324. Alternatively, perforated interval of interest 330 may be isolated by a sleeve or may not be mechanically isolated. A pad or pre-pad fluid may be pumped into the subterranean formation 320 at a pumping rate and pressure at or above the fracture gradient to create at least one fracture 300 in subterranean formation 320. Then, proppant 316 may be mixed with an aqueous based fluid via mixing equipment 309, thereby forming a fracturing fluid 317, and then may be pumped via pumping equipment 310 from fluid supply 308 down the interior of casing 302 and into subterranean formation 320 at or above a fracture gradient of the subterranean formation 320. As previously discussed, proppant 316 may be provided a liquid sand mixture comprising proppant, water, and a gelling agent. Pumping the fracturing fluid 317 at or above the fracture gradient of the subterranean formation 320 may create (or enhance) at least one fracture (e.g., fractures 300) extending from the perforations 323 into the subterranean formation 320. Alternatively, the fracturing fluid 317 may be pumped down through the production tubing, coiled tubing, or a combination of coiled tubing and annulus between the coiled tubing and the casing 302.

At least a portion of the fracturing fluid 317 may enter the fractures 300 of subterranean formation 320 surrounding wellbore 314 by way of perforations 323. Perforations 323 may extend from the interior of casing 302, through cement sheath 322, and into subterranean formation 320.

The pumping equipment 310 may include a high-pressure pump. As used herein, the term "high-pressure pump" refers to a pump that is capable of delivering the fracturing fluid 317 and/or pad/pre-pad fluid downhole at a pressure of about 1000 psi or greater. A high-pressure pump may be used when it is desired to introduce the fracturing fluid 317 and/or pad/pre-pad fluid into subterranean formation 320 at or above a fracture gradient of the subterranean formation 320, but it may also be used in cases where fracturing is not desired. Additionally, the high-pressure pump may be also capable of fluidly conveying particulate matter, such as the proppant 316, into the subterranean formation 320. Suitable high-pressure pumps may include, but are not limited to, floating piston pumps and positive displacement pumps. Without limitation, the initial pumping rates of the pad fluid, pre-pad fluid and/or fracturing fluid 317 may range from about 15 barrels per minute ("bbl/min") (2385 l/min) to about 80 bbl/min (12719 l/min), enough to effectively create a fracture into the formation and place the proppant 316 into at least one fracture 300.

Alternatively, the pumping equipment 310 may include a low-pressure pump. As used herein, the term "low pressure pump" refers to a pump that operates at a pressure of about 1000 psi or less. A low-pressure pump may be hydraulically coupled to a high-pressure pump that may be fluidly coupled to a tubular (e.g., wellbore supply conduit 312). The low pressure pump may be configured to convey the fracturing fluid 317 and/or pad/pre-pad fluid to the high pressure pump. The low-pressure pump may "step up" the pressure of the fracturing fluid 317 and/or pad/pre-pad fluid before it reaches the high pressure pump.

Mixing equipment 309 may include a mixing tank that is upstream of the pumping equipment 310 and in which the fracturing fluid 317 may be formulated. The pumping equipment 310 (e.g., a low-pressure pump, a high-pressure pump, or a combination thereof) may convey fracturing fluid 317 from the mixing equipment 309 or other source of the fracturing fluid 317 to the casing 302. Alternatively, the fracturing fluid 317 may be formulated offsite and transported to a worksite, in which case the fracturing fluid 317 may be introduced to the casing 302 via the pumping equipment 310 directly from its shipping container (e.g., a truck, a railcar, a barge, or the like) or from a transport pipeline. In either case, the fracturing fluid 317 may be drawn into the pumping equipment 310, elevated to an appropriate pressure, and then introduced into the casing 302 for delivery downhole.

Figure 4:
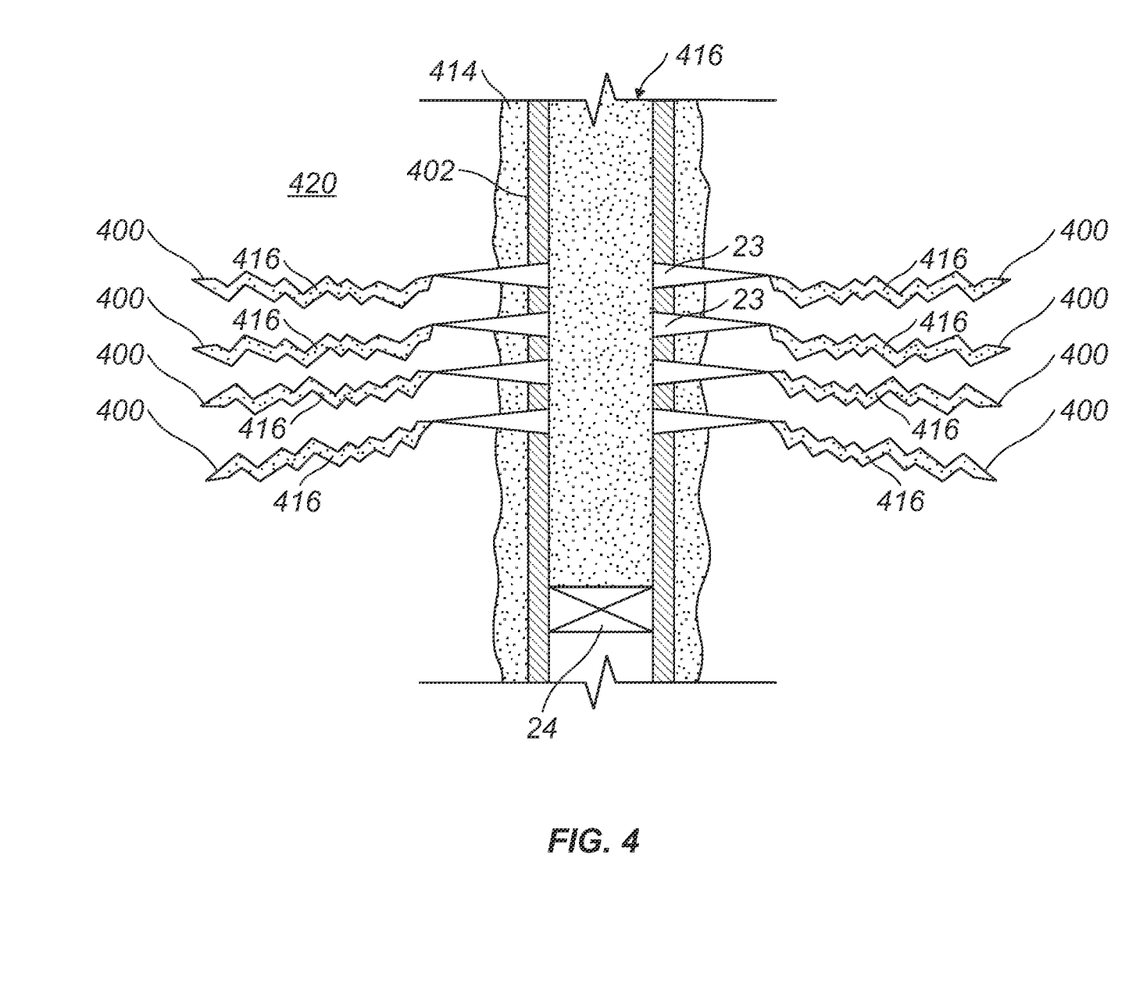
FIG. 4 is a schematic view of an example of a wellbore after introduction of a fracturing fluid.

Referring to FIG. 4, the wellbore 414 is shown after placement of the proppant 416 in accordance with systems and/or methods of the present disclosure. Proppant 416 may be positioned within fractures 400, thereby propping open fractures 400.

The exemplary fracturing fluid disclosed herein may directly or indirectly affect one or more components or pieces of equipment associated with the preparation, delivery, recapture, recycling, reuse, and/or disposal of the fracturing fluid. For example, the fracturing fluid may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The fracturing fluid may also directly or indirectly affect any transport or delivery equipment used to convey the fracturing fluid to a well site or downhole such as, for example, any transport vessels, conduits, pipelines, trucks, tubulars, and/or pipes used to compositionally move the fracturing fluid from one location to another, any pumps, compressors, or motors (e.g., topside or downhole) used to drive the fracturing fluid into motion, any valves or related joints used to regulate the pressure or flow rate of the fracturing fluid, and any sensors (i.e., pressure and temperature), gauges, and/or combinations thereof, and the like. The disclosed fracturing fluid may also directly or indirectly affect the various downhole equipment and tools that may come into contact with the fracturing fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The systems and methods may include any of the various features of the systems and methods disclosed herein, including one or more of the following statements.

Statement 1. A method of hydraulic fracturing comprising: mixing at least one liquid sand mixture with a fluid to produce a fracturing fluid; and conveying the fracturing fluid to two or more wellbores simultaneously, wherein the wellbores penetrate a subterranean formation.

Statement 2. The method of statement 1 wherein the liquid sand mixture comprises a proppant, water, and a gelling agent.

Statement 3. The method of any preceding statement wherein the proppant comprises at least one proppant selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

Statement 4. The method of any preceding statement wherein the proppant is present in an amount from about 15 lb/gal to about 30 lb/gal of the liquid sand mixture.

Statement 5. The method of any preceding statement wherein the gelling agent is selected from the group consisting of galactomannan gums, cellulose derivatives, xanthan gum, and combinations thereof.

Statement 6. The method of any preceding statement wherein the gelling agent is present in an amount of about 50 lbs/1,000 gal to about 80 lbs/1,000 gal of the liquid sand mixture and wherein the proppant is present in an amount of about 0.1 lb/gal to about 30 lb/gal of the liquid sand mixture.

Statement 7. The method of any preceding statement wherein the at least one liquid sand mixture comprises two or more liquid sand mixtures, wherein each of the two or more liquid sand mixtures comprises a proppant, and wherein the proppant in at least one of the two or more liquid sand mixtures has an average particle size that is disjointed from the average particle size of a remainder of the two or more liquid sand mixtures.

Statement 8. The method of any preceding statement wherein the two or more liquid sand mixtures have a different density, composition, crush strength or a combination thereof.

Statement 9. The method of any preceding statement wherein the step of mixing at least one liquid sand mixtures comprises mixing a first liquid sand mixture having a first property with the fluid to form a first fracturing fluid and mixing a second liquid sand mixture having a second property with the fluid to form a second fracturing fluid and wherein the step of conveying comprises conveying the first fracturing fluid and the second fracturing fluid simultaneously or one after the other, wherein the first property is different than the second property.

Statement 10. The method of any preceding statement wherein the first property and the second property are proppant type, proppant particle size, proppant crush strength, liquid sand mixture density, or a combination thereof.

Statement 11. The method of any preceding statement wherein the step of conveying comprises pressurizing the fracturing using a pump and flowing the fracturing fluid in to the wellbore.

Statement 12. A method of preparing a fracturing fluid comprising: pumping two or more liquid sand mixtures from two or more liquid sand mixture sources, wherein the two or more liquid sand mixture sources differ from one another based on density, composition, crush strength or a combination thereof; pumping water from a water source; and combining the two or more liquid sand mixtures and the water to form the fracturing fluid.

Statement 13. The method of any one of statements 11-12 wherein the two or more liquid sand mixtures each comprise water, a proppant, and a gelling agent.

Statement 14. The method of any one of statements 11-13 wherein the gelling agent is selected from the group consisting of galactomannan gums, cellulose derivatives, xanthan gum, and combinations thereof.

Statement 15. The method of any one of statements 11-14 wherein the gelling agent is present in each of the two or more liquid sand mixtures in an amount from of about 50 lbs/1,000 gal to about 80 lbs/1,000 gal and wherein the proppant is present in each of the two or more in an amount from of about 15 lb/gal to about 30 lb/gal.

Statement 16. The method of any one of statements 11-15 wherein the fracturing fluid further comprises at least one additive selected from the group consisting of salts, acids, fluid loss control additives, crosslinkers, gas, foamers, corrosion inhibitors, catalysts, gelling agents, diverters, friction reducers, antifoam agents, bridging agents, dispersants, flocculants, $H_2S$ scavengers, $CO_2$ scavengers, oxygen scavengers, lubricants, weighting agents, and combinations thereof.

Statement 17. A system comprising: a source of a liquid sand mixture; a source of water; a first pump hydraulically coupled to the liquid sand mixture and a conduit; a second pump hydraulically coupled to the source of water and the conduit; a third pump hydraulically coupled to the conduit and a first wellbore; and a fourth pump hydraulically coupled to the conduit and a second wellbore.

Statement 18. The system of statement 17 wherein the liquid sand mixture comprises water, a proppant, and a gelling agent, wherein the proppant is present in an amount of about 15 lb/gal to about 30 lb/gal and wherein the gelling agent is present in an amount of about 50 lbs/1,000 gal to about 80 lbs/1,000 gal Statement 19. The system of any one of statements 17-18 further comprising a fluid analyzer configured to measure at least one property of a fracturing fluid comprising the water and the liquid sand mixture and output a signal corresponding to the at least one property.

Statement 20. The system of any one of statements 17-19 further comprising an electronic control system, wherein the electronic control system is configured to accept the signal from the fluid analyzer and adjust a pumping rate of the first pump, the second pump, or both the first pump and the second pump in response to the signal.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

Each of the terms "program" and "software" may refer to executable computer code, groups of executable computer code, or computer code that may become or be used to create execute computer code. Particular components referred to as "programs" in the present disclosure may equivalently be referred to as "software". Likewise, particular components referred to as "software" in the present disclosure may equivalently be referred to as "programs". The terminology may be adopted merely to help the reader distinguish different computer codes (or groups of computer code).

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in the present disclosure and one or more patent(s) or other documents that may be incorporated herein by reference, the definitions that are consistent with the present disclosure should be adopted.

What is claimed is:

1. A method of hydraulic fracturing comprising:
    mixing a first liquid proppant mixture having a first proppant concentration with a base fluid to produce a first fracturing fluid having a second proppant concentration, wherein the first concentration of the first liquid proppant mixture is diluted to the second proppant concentration of the first fracturing fluid by the base fluid;
    mixing at least a second liquid proppant mixture having a third proppant concentration with the base fluid to produce a second fracturing fluid having a fourth proppant concentration, wherein the third proppant concentration of the second liquid proppant mixture is diluted to the fourth proppant concentration of the second fracturing fluid by the base fluid, and wherein the second proppant concentration of the first fracturing fluid and the fourth proppant concentration of the second fracturing fluid are not equivalent proppant concentrations,
    wherein the first liquid proppant mixture comprises proppant particles having an average particle size that is disjointed from an average particle size of proppant particles in the second liquid proppant mixture; and
    conveying the first fracturing fluid and then the second fracturing fluid to two or more wellbores simultaneously, wherein the two or more wellbores penetrate a subterranean formation.

2. The method of claim 1 wherein the first liquid proppant mixture comprises a proppant, water, and a gelling agent.

3. The method of claim 2 wherein the proppant comprises at least one proppant selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

4. The method of claim 2 wherein the proppant of the first proppant concentration is present in an amount from about 15 lb/gal to about 30 lb/gal of the liquid proppant mixture.

5. The method of claim 2 wherein the gelling agent is selected from the group consisting of galactomannan gums, cellulose derivatives, xanthan gum, and combinations thereof.

6. The method of claim 2 wherein the gelling agent is present in an amount from about 50 lbs/1,000 gal to about 80 lbs/1,000 gal of the liquid proppant mixture.

7. The method of claim 1 wherein the two or more liquid proppant mixtures have a different density, composition, crush strength, or a combination thereof.

8. The method of claim 1 wherein the first liquid proppant mixture comprises a first proppant and the second liquid proppant mixture comprises a second proppant and wherein the first proppant and the second proppant differ according to a property selected from the group consisting of proppant type, proppant particle size, proppant crush strength, or a combination thereof.

9. The method of claim 1 wherein the step of conveying comprises pressurizing the fracturing using a pump and flowing the fracturing fluid into the wellbore.

10. A method of hydraulic fracturing comprising:
    mixing a first liquid proppant mixture having a first proppant concentration and a first proppant material with a base fluid to produce a first fracturing fluid, wherein the first concentration of the first liquid proppant mixture is diluted to a second proppant concentration of the first fracturing fluid by the base fluid;

mixing at least a second liquid proppant mixture having a third proppant concentration and a second proppant material with the base fluid to produce a second fracturing fluid having a fourth proppant concentration, wherein the third proppant concentration of the second liquid proppant mixture is diluted to the fourth proppant concentration of the second fracturing fluid by the base fluid, and wherein the first proppant material and the second proppant material are not the same, wherein the first liquid proppant mixture comprises proppant particles having an average particle size that is disjointed from an average particle size of proppant particles in the second liquid proppant mixture; and conveying the first fracturing fluid and then the second fracturing fluid to two or more wellbores simultaneously, wherein the two or more wellbores penetrate a subterranean formation.

11. The method of claim 10 wherein the first liquid proppant mixture comprises a proppant, water, and a gelling agent.

12. The method of claim 11 wherein the gelling agent is selected from the group consisting of galactomannan gums, cellulose derivatives, xanthan gum, and combinations thereof.

13. The method of claim 11 wherein the gelling agent is present in an amount from of about 50 lbs/1,000 gal to about 80 lbs/1,000 gal of the liquid proppant mixture.

14. The method of claim 10 wherein the first proppant material comprises at least one proppant material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

15. The method of claim 10 wherein the first proppant is present in an amount from about 15 lb/gal to about 30 lb/gal of the liquid proppant mixture.

16. The method of claim 10 wherein the two or more liquid proppant mixtures have a different density, composition, crush strength, or a combination thereof.

17. The method of claim 10 wherein the first liquid proppant mixture comprises a first proppant and the second liquid proppant mixture comprises a second proppant and wherein the first proppant and the second proppant differ according to a property selected from the group consisting of proppant particle size, proppant crush strength, or a combination thereof.

18. The method of claim 10 wherein the second proppant concentration and the fourth proppant concentration are not equivalent proppant concentrations.

19. The method of claim 10 wherein the step of conveying comprises pressurizing the fracturing using a pump and flowing the fracturing fluid into the wellbore.

20. The method of claim 10 wherein the second proppant material comprises at least one proppant material selected from the group consisting of sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof.

* * * * *